US011229850B2

United States Patent
Chandrasekaran et al.

(10) Patent No.: US 11,229,850 B2
(45) Date of Patent: Jan. 25, 2022

(54) USER-CONTROLLED, ON-DEMAND GAMING CHANNEL

(71) Applicant: Roblox Corporation, San Mateo, CA (US)

(72) Inventors: Deepak Murali Chandrasekaran, San Mateo, CA (US); Guruprasath Krishnamurthy, Sunnyvale, CA (US); Andrew Gilmore Francis, Saratoga, CA (US)

(73) Assignee: Roblox Corporation, San Mateo, CA (US)

( * ) Notice: Subject to any disclaimer, the term of this patent is extended or adjusted under 35 U.S.C. 154(b) by 903 days.

(21) Appl. No.: 15/097,650

(22) Filed: Apr. 13, 2016

(65) Prior Publication Data
US 2017/0296929 A1    Oct. 19, 2017

(51) Int. Cl.
*A63F 13/795* (2014.01)
*A63F 13/35* (2014.01)
(Continued)

(52) U.S. Cl.
CPC ............ *A63F 13/795* (2014.09); *A63F 13/35* (2014.09); *A63F 13/48* (2014.09); *A63F 13/75* (2014.09);
(Continued)

(58) Field of Classification Search
CPC ........ A63F 13/795; A63F 13/48; A63F 13/75; A63F 13/35; A63F 13/87; A63F 2300/5533
See application file for complete search history.

(56) References Cited

U.S. PATENT DOCUMENTS 7,918,734 B2 *    4/2011  Gould .................... A63F 13/12
                                                463/42
8,171,123 B2 *    5/2012  Takeda .................. H04L 47/525
                                                709/223

(Continued)

OTHER PUBLICATIONS

"PokerStars Home Game: The PokerNews Guide to Setting Up" written by Barry Carter, published on or before Jan. 23, 2016, accessed and printed from URL <https://www.pokernews.com/news/2016/01/guide-to-setting-up-a-pokerstars-home-game-9650.htm>, 13 pages.*

(Continued)

*Primary Examiner* — Thomas J Hong
*Assistant Examiner* — Carl V Larsen
(74) *Attorney, Agent, or Firm* — IP Spring

(57) ABSTRACT

A VIP gaming service is provided through one or more servers providing games to players as members of the service, with one or more interactive interfaces executing on a web server, whereby players connected to the web server may select and configure games to play. Players connected to the server and logged in to the service are enabled by an interactive interface to purchase an ability to privatize an instance of playing a game, if a game developer has enabled the game to be hosted on a private server, and wherein privatizing the game selected as a VIP game enables the purchasing player to control entry of other players into the game in a specific instance of play, to alter circumstances and interactions in playing the game in the specific instance of play, and to lead the other players in the instance of playing the game.

20 Claims, 8 Drawing Sheets

(51) Int. Cl.
*A63F 13/87* (2014.01)
*A63F 13/75* (2014.01)
*A63F 13/48* (2014.01)

(52) U.S. Cl.
CPC ...... *A63F 13/87* (2014.09); *A63F 2300/5533* (2013.01)

(56) References Cited

U.S. PATENT DOCUMENTS

| | | | | |
|---|---|---|---|---|
| 9,007,189 | B1* | 4/2015 | Curtis | A63F 13/352 340/323 R |
| 10,729,975 | B1* | 8/2020 | Windrem | H04L 67/322 |
| 2002/0119821 | A1* | 8/2002 | Sen | A63F 13/87 463/42 |
| 2003/0190960 | A1* | 10/2003 | Jokipii | G07F 17/32 463/42 |
| 2006/0089189 | A1* | 4/2006 | Harvey | A63F 1/00 463/13 |
| 2009/0029777 | A1* | 1/2009 | Holt | G07F 17/32 463/42 |
| 2009/0191962 | A1* | 7/2009 | Hardy | G07F 17/32 463/29 |
| 2012/0172133 | A1* | 7/2012 | Trexler | G07F 17/3227 463/42 |

OTHER PUBLICATIONS

"Poker Home Games" published by Pokerstars.com on or before May 17, 2014, accessed and printed from URL <https://web.archive.org/web/20140517014219/http://www.pokerstars.com/poker/home-games/>, 3 pages.*

* cited by examiner

USER-CONTROLLED, ON-DEMAND GAMING CHANNEL

BACKGROUND OF THE INVENTION

1. Field of the Invention

The present invention is in the field of consumer online gaming, and pertains particularly to methods and apparatus for enabling private very important person (VIP) server, game reservation and game selection control for players and their VIP parties.

2. Discussion of the State of the Art

In the technical field of consumer online gaming, users subscribe to a gaming service in order to play online games alone or with other users. A gaming service provider may maintain multiple game servers distributed over a network whereby players who click on game links in a mobile gaming application or through a Web interface are transferred into one of a possible number of running instances of the selected game. Game servers running particular game instances are typically public servers accessible to any users who have accessed the appropriate interfaces and have selected a game link. In some cases, a game service provider may provide free games to subscribers, and in a variation of this case, non-subscribers may also access free games under certain circumstance in order to promote membership to the service provider.

Public server space is reserved for players by the service provider and players connect in a shared bandwidth environment hopefully having an acceptable Quality of Service (QoS) layer controlling the quality of media presentation and transfer over the shared connections. As the server space gets crowded, QoS may not be guaranteed for every player. Players currently have no control over the server connection quality and no control over which other players are inserted into a running game instance on the server. Therefore, what is clearly needed is a user access and control system for reserving server space for dedicated VIP game selection and play over a channel having dedicated bandwidth for a guaranteed QoS level.

BRIEF SUMMARY OF THE INVENTION

In one embodiment of the invention a VIP gaming service is provided, comprising one or more game servers providing virtual reality games to players registered as members of the service, one or more interactive interfaces provided to players by software executing on a processor of a web server, whereby players connected to the web server may select and configure games to play. Players connected to the server and logged in to the service are enabled by at least one interactive interface to select a game and to purchase an ability from the service to privatize an instance of playing the game, if a game developer has enabled the game to be hosted on a private server, and wherein privatizing the game selected as a VIP game enables the purchasing player to control entry of other players into the game in a specific instance of play, to alter circumstances and interactions in playing the game in the specific instance of play, and to lead the other players in the instance of playing the game.

In one embodiment VIP games are hosted and streamed from VIP servers having a guaranteed bandwidth and quality of service (QoS). Also in one embodiment the purchasing player is enabled to select other players to enter the VIP game, and to issue invitations to the other players to enter the game. Also in one embodiment invitations may be transmitted in a variety of channels, including text and email. And in one embodiment invitations include an interactive link to enter the VIP game.

In one embodiment of the service, in the circumstance that a player invited is not a member of the gaming service, the invited player is enabled to register to the gaming service to be able to enter the game. Also in one embodiment the service maintains a Friends list for individual members of the service, and wherein a member's Friends list, which may include enemies, is used in selecting players to be invited to enter an instance of a VIP game. Also in one embodiment the service periodically updates Friends lists for members, and enables members to edit their Friends lists. In one embodiment the service maintains clans among members, and wherein the purchasing player is enabled to invite clans to enter the purchased instance of the VIP game. And in one embodiment a clam leader of a clan invited to play the VIP game is enabled to select members of the clan to enter the game.

In another aspect of the invention a VIP gaming method is provided, comprising enabling a player logged in to a gaming service having one or more game servers providing virtual reality games to players registered as members of the service, through interactive interfaces provided by software executing on a processor of a web server, to select a game and to purchase an ability from the service to privatize an instance of playing the game as a VIP game hosted on a VIP server, if a game developer has enabled the game to be hosted on a VIP server, controlling, by the purchasing player, entry of players to the instance of the VIP game, launching an instance of the VIP game with purchasing player and other players, and controlling circumstances and interactions in playing the game in the specific instance of play by the purchasing player as leader in the instance of the VIP game.

In one embodiment of the method steps are provided for hosting and streaming VIP games from VIP servers having a guaranteed bandwidth and quality of service (QoS). Also in one embodiment there is a step for the purchasing player to select other players to enter the VIP game, and to issue invitations to the other players to enter the game. Also in one embodiment invitations may be transmitted in a variety of channels, including text and email. And in one embodiment there is an interactive link in invitations to enter the VIP game.

In one embodiment of the method there is a step enabling a player invited who is not a member of the gaming service, to register to the gaming service to be able to enter the game. Also in one embodiment there is a step for using a member's Friends list, which may include enemies, in selecting players to be invited to enter an instance of a VIP game. In one embodiment there are steps or periodically updating Friend's lists, and enabling members to update their Friends lists. In one embodiment there are steps for inviting clans to enter the purchased instance of the VIP game, in circumstances that the service maintains clans among member. And in one embodiment there are steps for a clan leader of a clan invited to play an instance of the VIP game to select members of the clan to enter the game.

DETAILED DESCRIPTION OF THE INVENTION

The inventors provide a unique gaming platform and method for enabling a player-controlled gaming environment with VIP access permissions set by a controlling player. The present invention is described in enabling detail using the following examples, which may describe more than one relevant embodiment falling within the scope of the present invention.

Figure 1:
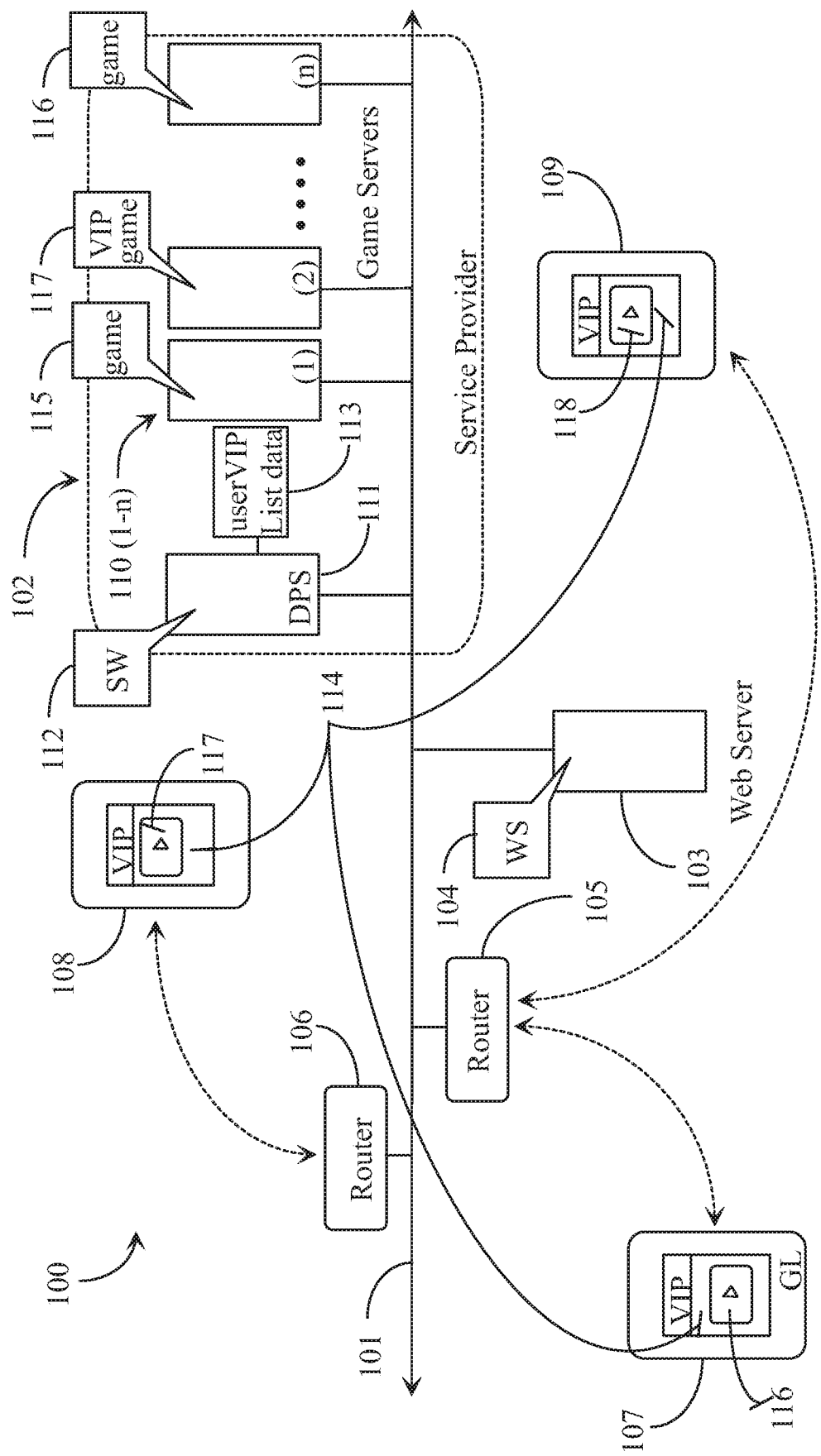
FIG. 1 is an architectural overview of a gaming network supporting VIP player control of a bandwidth-dedicated gaming channel according to an embodiment of the present invention.

FIG. 1 is an architectural overview of a gaming network 100 supporting VIP player control of a bandwidth-dedicated gaming channel according to an embodiment of the present invention. Gaming network 100 includes the well-known Internet network illustrated herein by a network backbone 101. Backbone 101 represents all of the lines equipment and access points that make up the Internet as a whole including any connected sub-networks. Therefore, there are no geographic limitations to the practice of the present invention. Backbone 101 supports a gaming service provider domain 102. Provider domain 102 includes equipment and software required to provide online gaming services to consumers who subscribe to such services, typically through a Website. A host of provider domain 102 may maintain a Website (WS) 104 hosted on a Web server 103 supported by backbone 101 in this example. Server 103 may be maintained by a third-party Web hosting service or an in house Web hosting service without departing from the spirit and scope of the present invention.

Website 104 may be a contact point between gaming service subscribers and provider 102. Website 104 enables searching or browsing of online games, and may advertise or otherwise promote featured or highly popular online games and virtual worlds. Website 104 enables secure access and connection to at least one game server. In this example, service provider domain 102 includes game servers 110 (1-n). Game servers 110 (1-n) may be maintained within a physical location of the service provider or they may be cloud-based and distributed over a larger geographic region. In a preferred implementation they are distributed, and in current art known to the inventor, users connect to the server that is running a selected instance of a game and that may be closest to the accessing user's geographic position in the network for latency reduction purposes.

Backbone 101 supports at least one data router, in this case, a data router 105 and a data routed 106 that may function as edge routers or bridges connecting a wired or wireless data network (carrier not illustrated) to the wired Internet network 101 through an Internet service provider (not illustrated). In this implementation, connection to game server(s) 110 (1-n) in domain 102 may be through router 105 or through router 106 from a wireless or wired network (not illustrated) enabling gaming devices or stations such as a gaming device 107, 108, or 109 depicted herein, to engage in online game play through the respective routers. Devices 107, 108, and 109 may be any wirelessly capable or tethered computing appliances having browser capability for accessing WS 104 to be redirected to one or more of gaming servers 110 (1-n). In this example, devices 107, 108, and 109 are wireless gaming devices such as, but not limited to a smart phone, a tablet computer, a laptop computer, a gaming station.

Gaming devices 107, 108, and 109 may have a software (SW) gaming application 114 executable therefrom for the purpose of simplifying and specializing gaming experience according to an embodiment of the invention. Application 114 may be acquired by download from WS 104 hosted on Web server 103. Application 114 is browser enabled and capable of site navigation on the Internet network. Application 114 is preferred, but not specifically required, to practice the present invention. Users not having application 114 may search, browse and play games on WS 104. Users having application 114 installed may connect and search, browse, and play games through the application adapted for mobile devices.

Backbone 101 supports a back-end data processing server (DPS) 111 within domain 102 of the service provider. Data processing sever 111 is a back-end server that may subscribe to gaming feeds from servers 110 (1-n) and may record game play history for gaming subscribers such as those operating devices 107, 108 and 109. Data processing server 111 hosts a software application 112. Application 112 enables subscribers to host Very Important Person (VIP) games that may be served over a dedicated channel reserved at optimal Quality of Services (QoS) for the players that are selected and invited by a VIP game leader.

WS 104 includes SW that publishes an updated white list or Friends status of players who have purchased or otherwise acquired a private server version of an online game or virtual world. Application 112 may communicate with Website (SW) 104 periodically in order to update permissions data relative to Friends of a player that may later be invited to play a game with the VIP game leader over a dedicated channel. Updated information may be stored in a data repository 113 having connection to DPS 111.

Permissions SW integrated with Website 104 keeps track of player friending actions and keeps local records for all of the subscribing users patronizing the service provider. Server 111 aided by SW 112 may subscribe to this published information and may use it to generate invitations and a VIP game link to Friends of a player who has acquired a VIP game session and wants to invite friends to play. Servers 110 (1-n) host games 115 (1-n). Of the game instances hosted on servers 110 (1-n), there is a VIP game 117 on server 110 (2), representing a game hosted by a game leader (GL) such as a person operating device 107.

A VIP game leader 107 may log in to Website 104 from device 107 running application 114 and select, for example, a game to play over a dedicated VIP channel. Dedicated channel refers to a private dedicated server space at an optimum guaranteed QoS where the VIP host GL may control who else from a list of known users may play the game with the host. Invitees of the VIP host may include friends that are known to the service provider through tracked user management of a social channel at the Website (104). Invitees may also include other Friends of a player that may not be current service subscribers. A VIP game leader may configure a list of invitees on the fly for a specific VIP game or may select a preexisting list of Friends or a designated group of Friends.

A VIP game may be configured for private server allowance by a game developer, meaning that the developer gives permission to the service provider for the game to be purchased as a VIP game played over a reserved and dedicated high-quality server channel. Service provider 102 and the developer of a game configured for VIP private server may share revenue generated through purchase of the VIP game to play by any subscriber to the gaming service. In this example a VIP game leader is operating device 107 and has a game link 116 to a VIP game on server 110 (2). A user operating device 108 and a user operating device 109 may be Friends of the game leader and in this example, may have each received a VIP game link to game 115 (2), more particularly, link 117 within mobile application 114 on device 108 and link 118 within mobile application 114 on device 109. It is noted herein that the received links are to the same VIP game 115 (2).

In one implementation a VIP user may send VIP game links to friends in a notification through Website 104, through mobile application 114, or through email and through a text message to the Friends' gaming devices. Users who receive a VIP game link may click on the link to be directed over the network to the server and VIP game. During the process of connecting users to a VIP game instance, such as VIP game 115 (2) running on server 110 (2), the user may be required to log-in if the user is a subscriber to the service, or to sign up for the service, in order to play the game over the private channel. It may be noted herein that the service may also send out notifications with game links to VIP games to a VIP user's configured white list or invite list. Such a list may be known to the system and selected for a particular game by the VIP user. A list of invitees may also be configured on the fly after a VIP game has been purchased and is ready for play.

It may be noted herein that the number of invitees that may enter a single VIP game over a private channel may vary according to the type of game or virtual world. In one implementation there may be a minimum number and a maximum number that may be invited to play a VIP game. In a variation of this implementation, a statistical prediction may be made by algorithm as to the number of invitees required to be notified in order to result in a maximum or near maximum number of invitees that actually join the game. Such a prediction may be based on historical evidence relative to ratios of invitees to game participants for any single game or for a group of games.

Figure 2:
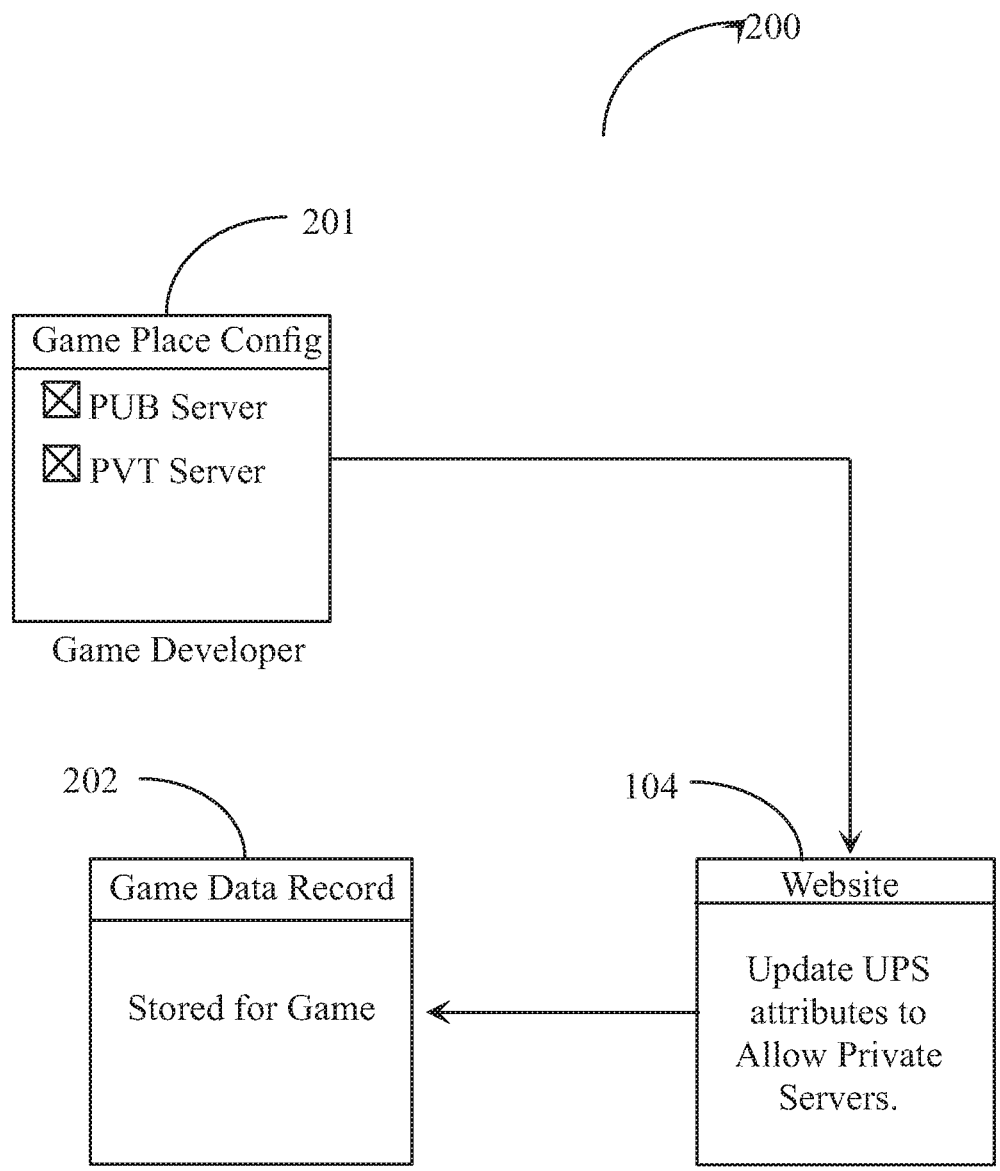
FIG. 2 is a block diagram depicting game developer selection and update of private server attributes for a particular game.

FIG. 2 is a block diagram 200 illustrating game developer selection and updating of private server attributes for a particular game. Any game developed for the gaming service may be configured for VIP game play by the game developer. In one implementation, the game developer shares a percentage of revenue generated through VIP game purchases made by subscribing users. A game developer may have an application or interface provided through the service that includes configuration screens like a configuration screen 201. Exemplary configuration screen 201 is a game place configuration screen having at least the option of allowing the game to be played on a public server (lower QoS) or over a private dedicated server (optimum QoS). For a VIP game the developer may select private server (PVT Server) to allow the service to stage the game for possible VIP play.

Universal Private Server Attributes for a VIP game may be uploaded with the game by the game developer to Website 104. The Website may also update an existing game to allow private servers initiated by game developer. The SW on the Website may create a game data record 202 for a developed game indicating that the game may be reserved for private server use. Likewise, a game developer may update an existing game having a game data record to allow private servers, thus making the game available for purchase over a private channel having an optimal QoS.

Figure 3:
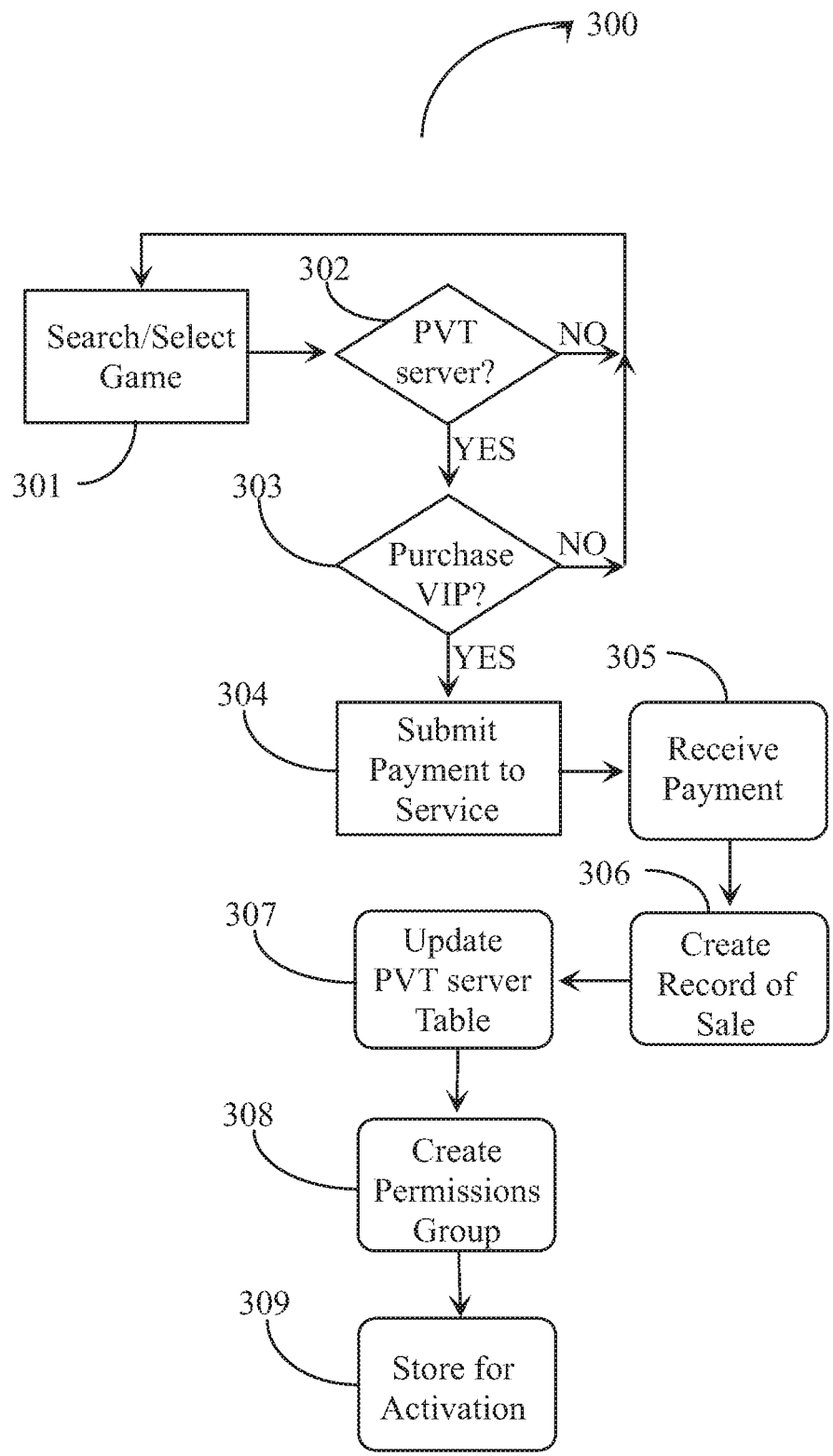
FIG. 3 is a process flow chart depicting steps for securing a private gaming channel according to an aspect of the present invention.

FIG. 3 is a process flow chart 300 depicting steps for securing a private gaming channel according to an aspect of the present invention. VIP games allowed on a private server may be displayed as advertisement to gaming service subscribers at the Website and through the mobile gaming application. Such game advertisements may include a link to purchase the game for VIP play. Transaction processing may be handled by an existing transaction SW employed for other transaction purposes at the service site such as buying virtual game items or resources, and so on.

At step 301 a user who is a gaming service subscriber may browse, search, or select a game or link through a mobile application like application 114 of FIG. 1 or while directly connected to the service Website. Game links returned to the user may include visual and text indication of whether the game is allowed on private server. In one implementation a user may input Private Server Only in a search for VIP games such that all results are links to VIP games.

At step 302 the user may determine whether or not a game being considered is allowed for a private server. If the game considered is not allowed on a private server at step 302, the process may resolve back to step 301. If the game considered is allowed on private sever at step 302, then the user may determine whether to purchase play of the game or not at step 303. The purchase pricing for playing VIP games may vary from game to game and may include other variables such as length of time playing on private server, whether the transaction might be a repetitive scheduled event, and so on.

If the user determines not to purchase VIP play of the game at step 303, the process may loop back to step 301. If the user determines to purchase VIP play of the game at step 303, the user may undertake a transaction process resulting in submission of payment for VIP play to the service at step 304. At step 305, the service may receive payment and may create a transaction record of the sale at step 306. In one aspect a VIP game may be reserved for a scheduled event or for a one-time immediate play on the fly.

At step 307, the Website may update a private server Allowed table with the VIP game start details. At step 308 the user may create or select an existing permissions group. A permissions group may be a listing of Friends of the user that the user wishes to invite to a private server session of play of the VIP game. A permissions group may include opposing groups within the allowed group such as a group of Friends and a group of Enemies, if supported by the particular VIP game. The gaming server(s) hosting the instance may regularly subscribe to updates from Permissions SW at the Website and may create the private server channel on the fly for game play.

The data is updated at the server hosting the private channel and the game instance. The game details including all allowed participants invited to play the game may be stored for activation at step 309. This process does not cover invitations sent by the user or by the service to invitees on the permissions list. However, this step may be included herein as a final step before actual activation of a scheduled VIP session or on-the-fly VIP session.

Figure 4:
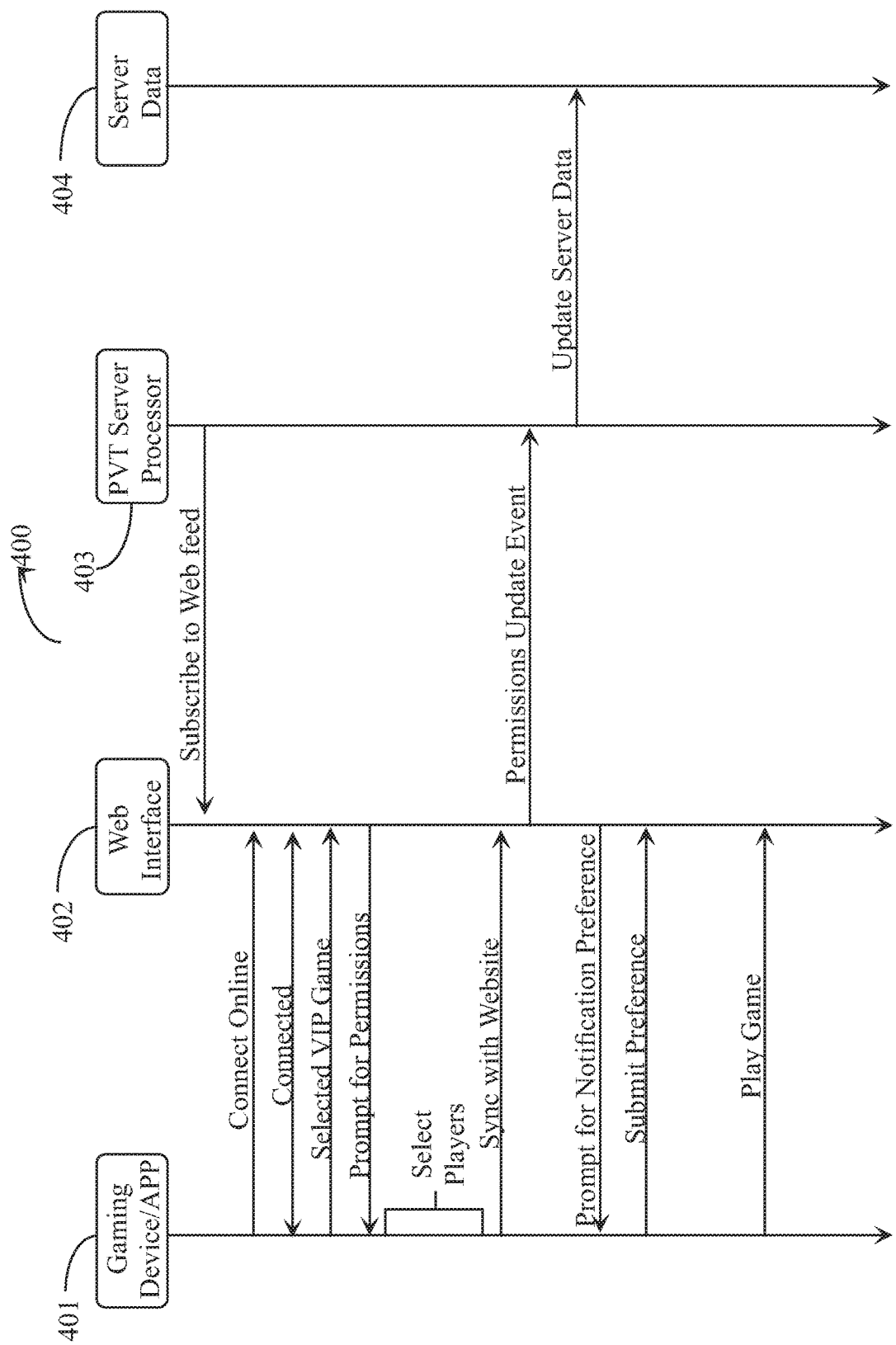
FIG. 4 is a sequence diagram depicting interaction between system components in configuring permissions and initiating play of a VIP game.

FIG. 4 is a sequence diagram 400 illustrating interaction between system components in configuring permissions and initiating play of a VIP game. In this example, main components interacting to practice the present invention include a Website interface 402, analogous to WS 104 of FIG. 1, a mobile gaming application on a gaming device 401 (APP 114, devices 107-109), a server data repository 404 (repository 113 FIG. 1), and a private server processor (PVT) 403.

Private server processor 403 may be located at a data processing server such as server 111 of FIG. 1 running SW 112. PVT server processor 403 may subscribe to Website permissions SW at Web interface 402 such that any new data and updates are promptly received. A user operating through device and app 401 may connect online to Website interface 402 to configure permissions of a selected VIP game for subsequent VIP session play. Once the user is connected to interface 402, the user may select a particular VIP game for permissions and subsequent activation. It is noted herein that it is assumed that the user has already transacted with the service and is ready to play the game.

The gaming service may prompt the user to configure or confirm permissions for the selected VIP game. This may be displayed in the mobile application on a permissions configuration screen or the like that accepts input from the user through the gaming device. The user may select the players that will be invited to a VIP session of the selected game. When finished, the user may synchronize with Permissions SW on the Website.

When the Website receives the permissions data from the user sync operation it may create an event that it publishes as a permissions update event associated with the user and the selected VIP game. The published event may be pushed as a notification to server processor 403. Server processor 403 may update the private server data store 404 with the new information.

In one implementation Website 402 may prompt the user for notification preference. Notification preference may be a selection between user send notifications and service send notifications. Notifications may include at least the game description, the game time, and an executable link to the game. In one implementation, an invited player may see who else has also been invited to play the VIP game. The user may select notification preference and may submit it to the Website. In one implementation, the gaming service may send notifications to a portion of the invitee list while the user sends notifications to the remainder.

It may be noted herein that an invited player may or may not be a current gaming service subscriber, and if not, the player may be afforded an opportunity to register with the service before entering a game to which they have been invited. The user may execute the game (initiate VIP game) when appropriate such as at a scheduled time or whenever the user determines that it should be initiated. In one implementation, a VIP game may be initialized immediately after notifications are sent to invitees and the game may be initiated on the private server, and invited players appear in the game as they are processed into the game by the gaming SW. In one implementation, there may be a gaming player queue associated with a running instance of a VIP game, whereby invitees that cannot get into the game because it is full may wait for a player to drop out giving them an entrance. Such a queue may include priority criterion or it may be a first in, first out queue.

Figure 5:
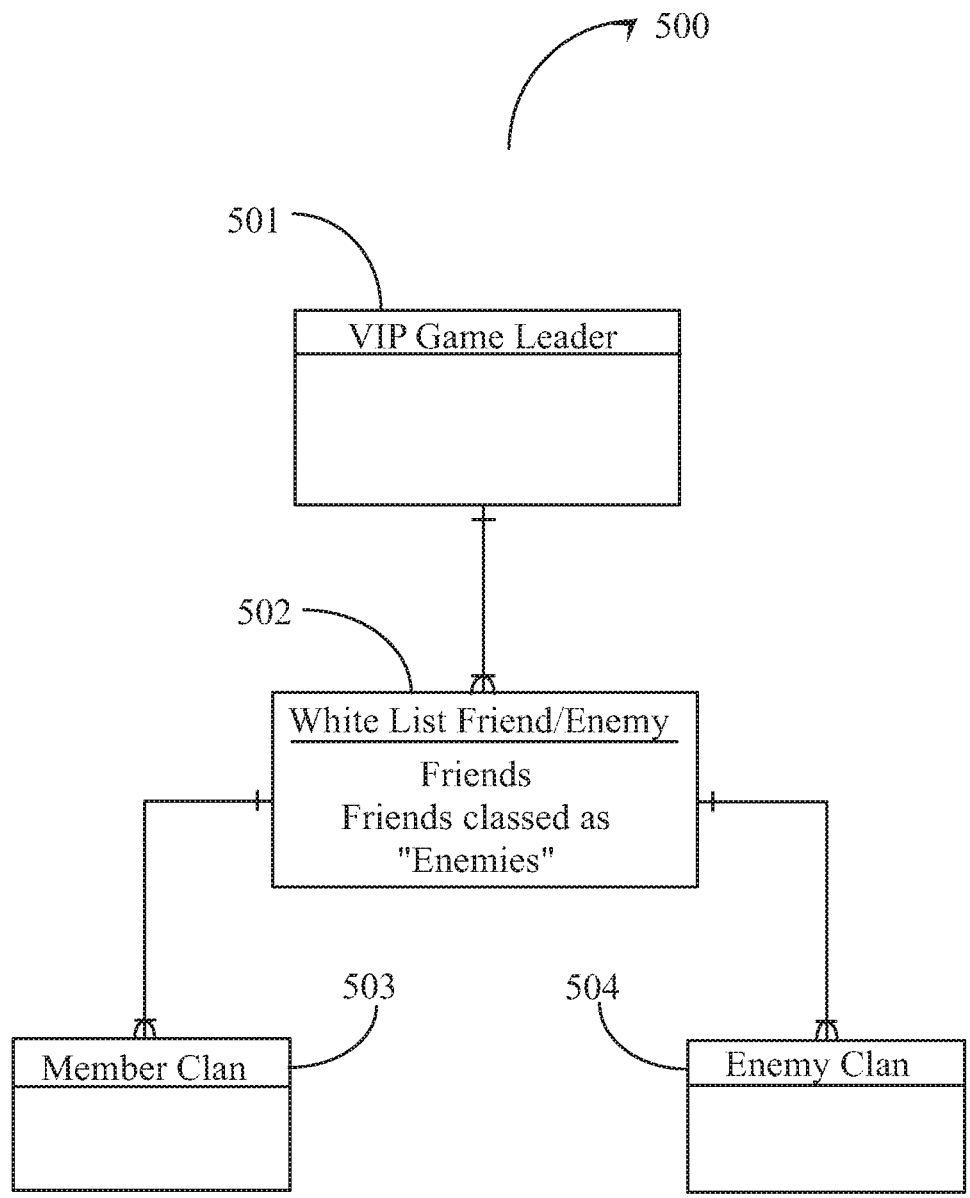
FIG. 5 is a UML diagram depicting a VIP leader model according to an aspect of the present invention.

FIG. 5 is a UML diagram depicting a VIP game leader model 500 according to an aspect of the present invention. Model 500 includes a VIP game leader 501. Game leader 501 represents a user that has purchased at least one VIP game session on a private server channel. VIP game leader 501 includes a white list attribute 502. White list attribute 502 represents a listing of friends of the user that the user considers allowed as invitees to a VIP game session hosted by the user.

It is noted herein that a user initiating a VIP game session is the gaming leader in the game, and may be given special powers to transform gaming environments, taking the other players into those environments during game play. In one implementation, a game leader may exit a VIP game and the game may be left running for the remaining players with one of those players being designated as a new gaming leader in the field for that game session.

White list 502 may include predesignated groups of friends having different titles. In this example white list 502 includes at least one Friend grouping classed as a member clan 503. White list 502 also includes a Friend grouping classed as an enemy clan 504. In this way a user may save time setting up a member clan and an enemy clan to oppose one another in a particular game that recognizes and that supports the activity. In a variation of this implementation there may be more than one member clan and more than one enemy clan selected to join a running instance of a VIP game initiated by the game leader. In addition to the classification of certain Friend groupings as member clan and enemy clan, the concept of teams may also be modeled for certain games where players are one or the other team. There are many possibilities, and game leader model 500 is customizable to the user and the particular game selected for VIP play.

At first play of a new VIP game, some configuration of white-listed friends into one or more new groups particular to the game may be appropriate. In one implementation, a game leader's basic model is used as the abstract base and the attributes may be configured/selected by the game leader. In some implementations attributes of the core model may be saved and reused or selected for use again at a different VIP game session. There are many possibilities.

Figure 6:
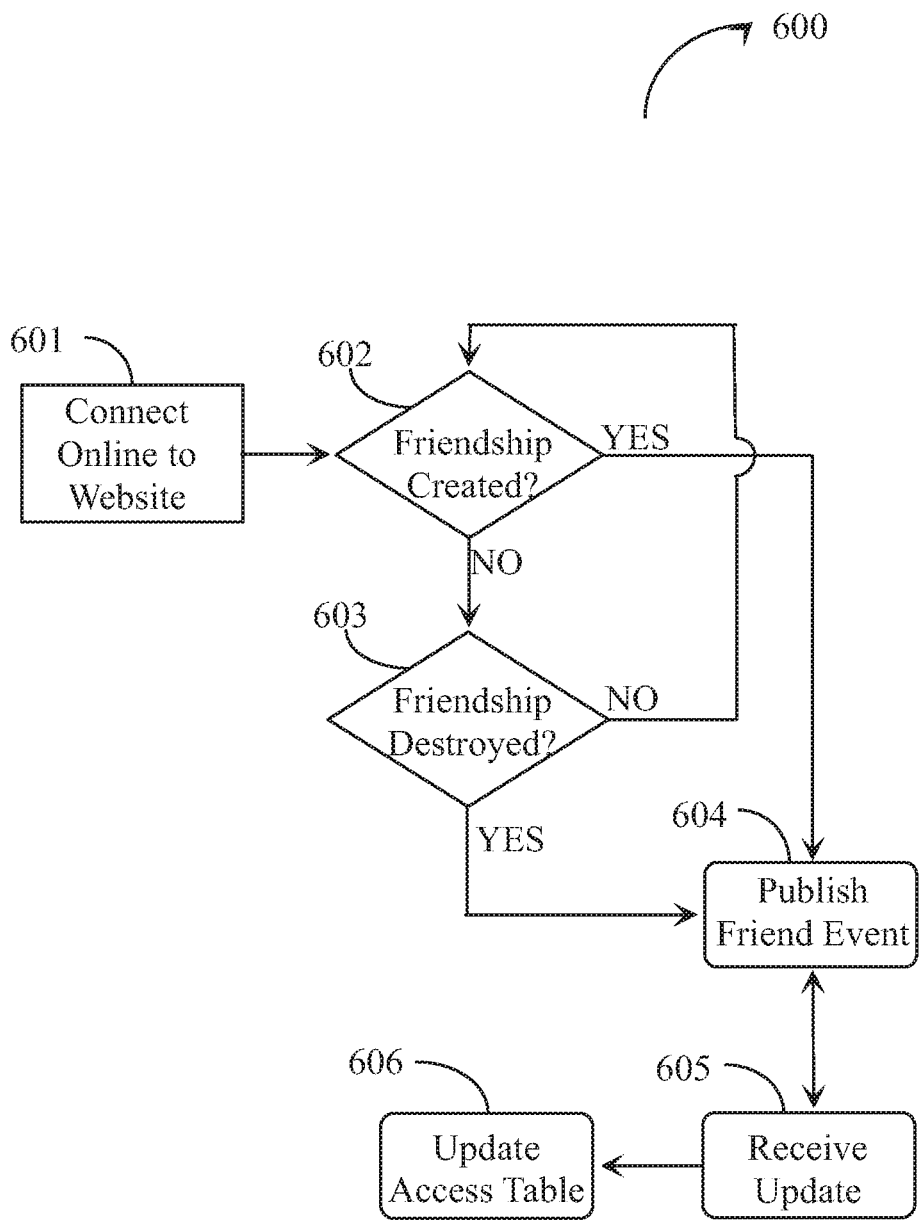
FIG. 6 is a process flow chart depicting steps for automatic update of white list data for VIP game access according to an aspect of the present invention.

FIG. 6 is a process flow chart 600 illustrating steps for automatic update of white list data for VIP game access according to an aspect of the present invention. In one implementation, a user's white list for VIP game play may be periodically updated according to events such as un-friending a user or making a new friend. These events occur when a user is connected online at step 601. At step 602 the Website SW determines whether or not the user has created a new friendship.

If it is determined that the user has acquired a new Friend at step 602, the Website may record and publish the event as a new Friend event at step 604. This step assumes that the new Friend is intended to be a potential invitee to a VIP game session hosted by the user. At step 605, the server data processor that subscribes to updates from the Website receives the new Friend event and may then update the permissions access table for VIP game play at step 606. The permissions white list may represent an abstract listing of all of a user's Friends that the user determines are potential invitees. The user may update for each VIP game played and may save any particular groupings of invitees) for a next VIP game session of the same game.

If it is determined that a new Friend was not acquired at step 602, the process may move to step 603 where it may be determined whether the user has lost a Friend. A destroyed friendship determination may result from actions such as un-friending, un-following, or the like. In some cases, the determination may be a result of data indicating that a Friend of the user on the list un-Friended or quit following the user.

If it is determined at step 603 that a friendship has been destroyed, the Website creates and publishes this Friend event at step 604. The server data processor receives the update at step 605 and updates the permissions access table at step 606. A game leader's white list is kept as up to date as practical through regular Web publishing of Friend events so that less data needs to be processed between the time a user purchases a VIP game session and the start of the VIP session.

Figure 7:
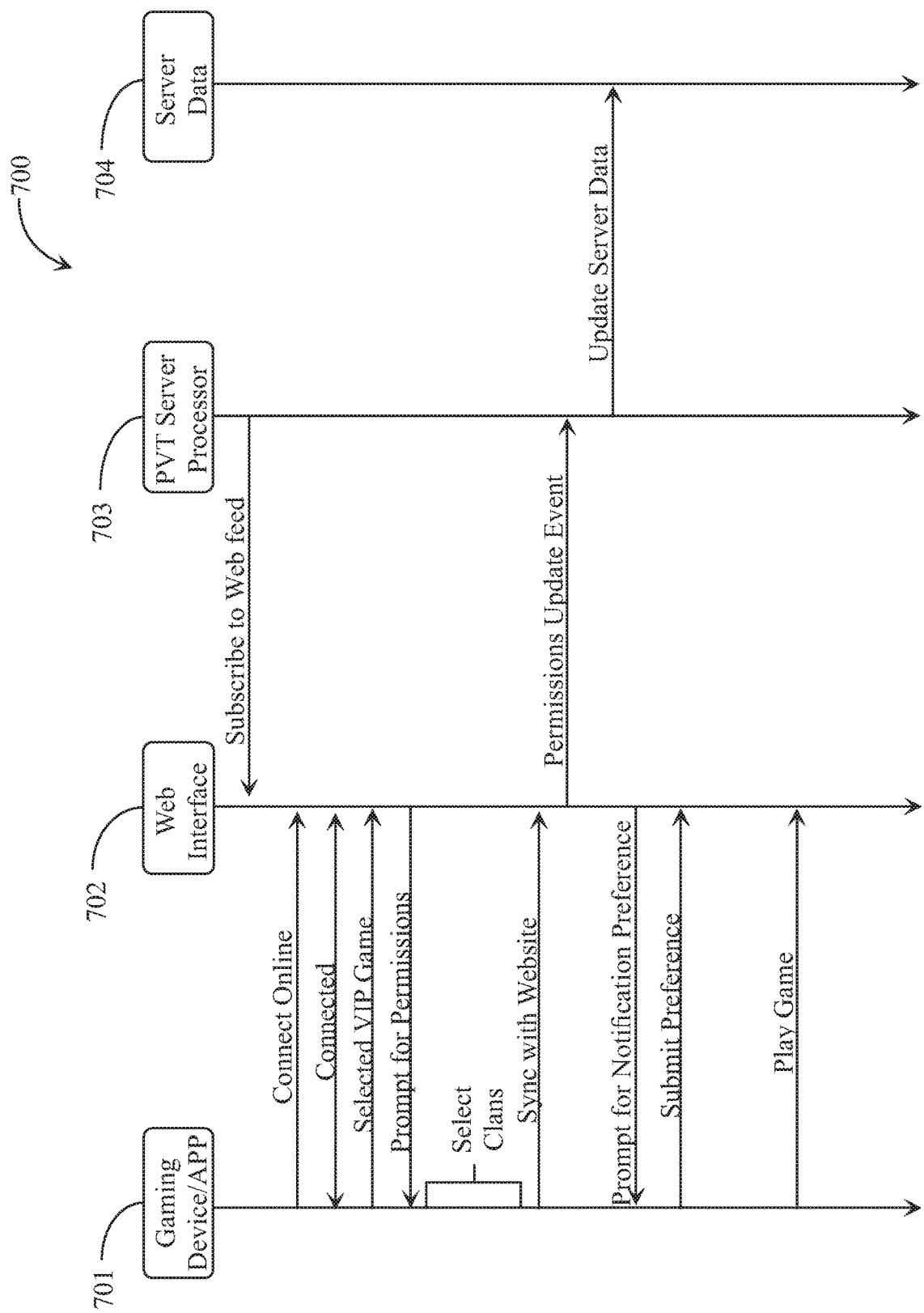
FIG. 7 is a sequence diagram depicting interaction between system components in configuring group access permissions according to an aspect of the present invention.

FIG. 7 is a sequence diagram 700 depicting interaction between system components in configuring group access permissions according to an aspect of the present invention. In this example, main components interacting to practice the present invention include a Website interface 702, analogous to WS 104 of FIG. 1, a mobile gaming application on a gaming device 701 (APP 114, devices 107-109), a server data repository 704 (repository 113 FIG. 1), and a private server processor (PVT) 703. These components share the same descriptions as the components depicted in FIG. 4.

Private server processor 703, like processor 403 of FIG. 4, may be located at a data processing server such as server 111 of FIG. 1 running SW 112. PVT server processor 703 may subscribe to Website permissions SW at Web interface 702 such that any new data and updates are promptly received. A user operating through device and app 701 may connect online to Website interface 702 to configure permissions of a selected VIP game for subsequent VIP session play. Once the user is connected to interface 702, the user may select a particular VIP game for permissions and subsequent activation.

The gaming service may prompt the user to configure or confirm permissions for the selected VIP game. This may be displayed in the mobile application on a permissions configuration screen or the like that accepts input from the user through the gaming device. However, instead of selecting individual players the user may select one or more groups that have been identified and classed, or that might be created and then selected for a first time. The user may select the clans that will be invited to a VIP session of the selected game. When finished, the user may synchronize with permissions SW on the Website.

It is noted that it is assumed that the user has already transacted with the service and is ready to play the game. At this point the sequence has been identical to the sequence described with reference to FIG. 4 with the exception that the game leader is selecting groups as opposed to individuals to invite to a subsequent VIP session.

The rest of the sequence chart is the same as in FIG. 4. That is to say that the Website may publish the permissions event (selection of clans) and prompt for notification preference. The server processor 703 may update the access tables in the server data for that particular game. In one implementation, a notification may be sent to a "leader of a clan and the clan leader may publish the event to the rest of the clan. In another implementation, a game leader may designate an enemy clan leader from a friend list and then extend an invitation to the enemy clan leader to the VIP session whereby it is the responsibility of the enemy clan leader to invite the appropriate number of enemies to the VIP session. In this regard the game leader and enemy clan leader are entirely responsible only for fulfilling their own clans for game play. In essence, a single VIP game instance may have two game leaders, the leader of the member clan (clan of the original leader) and of the enemy clan, the appointed friend of original leader. It may also be noted herein that the game leaders in this case may modify, reconfigure and update their clans as they see fit with the data published through the Website and subscribed to by the server processor which in turn updates the correct game access table for that particular VIP game.

Figure 8:
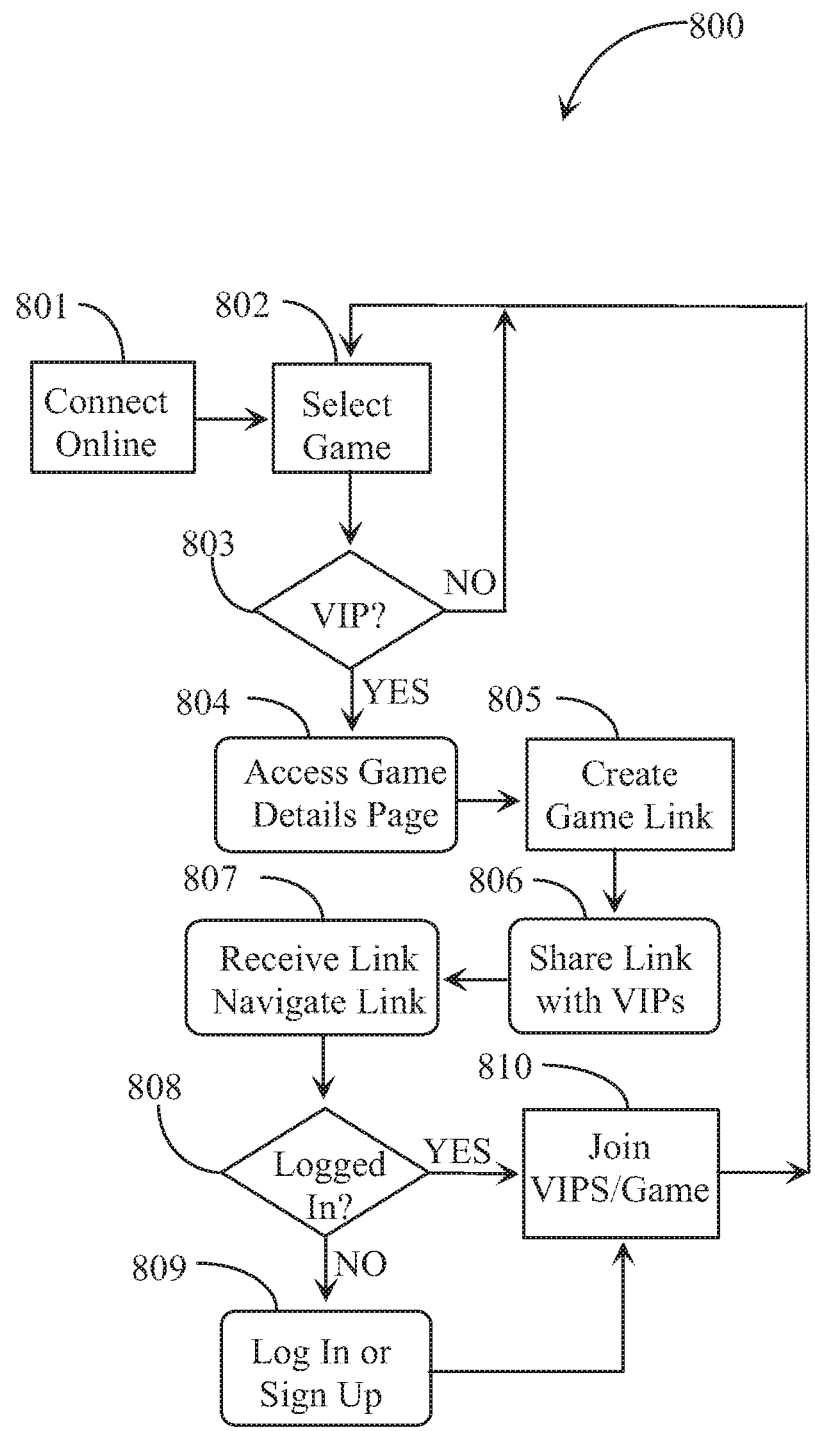
FIG. 8 is a process flow chart depicting steps for creating and sharing a navigable link to a private gaming channel with access permissions according to an aspect of the invention.

FIG. 8 is a process flow chart 800 depicting steps for creating and sharing a navigable link to a private gaming channel with access permissions according to an aspect of the invention. Notifications are propagated over the network to VIP game invitees in a variety of ways, including via the Web interface, mobile gaming application, email, or through text message to VIP invitees of a game leader. Such notifications may include the game description, price of VIP purchase, a game details page including game title, and a list of other invitees, and an executable game link to jump to the game server for play.

At step 801 a user may connect online to the Website directly or via the mobile application to select a game at step 802. If the selected game is determined not to be a VIP game allowed for private server at step 803, the process may loop back to step 802. It is assumed in this exemplary flow that the user has already purchased the VIP session and updated permissions for access.

If the game is a VIP game at step 803, the user may access the game details page at step 804. The user may then create a game link for notification purposes at step 805. It is noted herein that processes for purchasing a VIP game session and for configuring access permissions for the VIP game may be sub-processes or sister processes to this process without departing from the spirit and scope of the present invention. Such processes may, in one implementation, be integrated with one another in an overall process or may be run in tandem as separate processes without departing from the spirit and scope of the present invention.

At step 806, the generated gaming links are shared in VIP notifications to the friends or VIPs invited to play. Notifications may source from the gaming service SW or from SW utilized by the game leader according to notification preference stated by the game leading user. At step 806, VIPs may receive notifications including the gaming link and may execute the link to navigate in step 807 to the gaming server and VIP game. In one implementation, a user may receive a notification to a VIP session wherein the session has started before the notification was received. In this case the invitee may join the game while it is still in progress.

At step 808 it may be determined whether a user that accessed the server and game page is logged into the gaming service as an authorized subscriber. If it is determined that an accessing invitee is logged in to the gaming service at step 808 then that invitee may be immediately inserted into the game at step 810. If it is determined that the accessing user is not logged into the gaming service at the time of request at step 808, the process may move to step 809 where the user may be asked to log in and if not already a subscriber to sign up or register to play as a subscribing member.

Once authenticated as a subscriber the user is immediately thereafter inserted into the game. In this way a game leader might invite a friend that does not happen to be a member of the gaming service wherein that friend may join the service to receive the VIP session time with the game leader and other friends. In the case that a friend is not yet "registered" with the service, a manual process may be available to the game leader to add the friend to the game white list by reference, using a name and email address, for example. If that user chooses to accept the game invitation and shows up at the server without a membership subscription to the gaming service, the sign-up option may be provided for that user. In this case the sign-up option may be streamlined to help get the new member into the VIP session as quickly as possible.

It is noted herein that once a subscriber has purchased and configured access for a VIP game it may be in the future activated or deactivated or deleted from server tables by the user. If the user maintains the private server in an active state, it means that the user may launch the game at any time and the current access table for that game on that private server channel is maintained up to date and locally available to the gaming server. If a VIP instance is deactivated it means that it may not be accessed unless reactivated. In this case, the server may delete permission access tables for the game saving server space. When the server is reactivated for the VIP game by the user, the server processor may get the new or updated access permissions from the permissions SW running at the Web interface. Such routines may be scripted using Web service description language (WSDL) or a variant thereof or a substitute therefor without departing from the spirit and scope of the present invention.

In one implementation, activity history data is collected of game leaders that purchase VIP game sessions and certain data learned may qualify the game leader for discounts on future game services and other benefits that might be made applicable. For example, a game leader may be responsible for inviting one or more friends who then register for a game subscription in order to play with the user. The game leader may get credit for each instance of this type, the credit accumulating until the user may use the credit, such as to buy a next VIP session. Other benefits might free public server game play for the game leader, free game accessories, free game developer tools, etc.

It will be apparent to one with skill in the art that the VIP game play platform of the invention may be provided using some or all of the described features and components without departing from the spirit and scope of the invention. It will also be apparent to the skilled person that the embodiments described above are specific examples of a single broader invention that may have greater scope than any of the singular descriptions taught. There may be many alterations made in the descriptions without departing from the spirit and scope of the present invention.

It will further be apparent to the skilled person that the arrangement of elements and functionality for the invention is described in different embodiments in which each is exemplary of an implementation of the invention. These exemplary descriptions do not preclude other implementations and use cases not described in detail. The elements and functions may vary, as there are a variety of ways the hardware may be implemented and in which the software may be provided within the scope of the invention. The invention is limited only by the breadth of the claims below.

The invention claimed is:

1. A very important person (VIP) gaming system, comprising:
   a private game server including first software executing thereon, wherein the private game server is configured to provide a guaranteed bandwidth and quality of service (QoS) to at least one virtual reality game specified by a first player of a plurality of players, and wherein the first player is registered as a member of the VIP gaming system;
   a web server in operative communication with the private game server and including an interactive interface executing thereon, wherein the web server is configured to provide access to the at least one virtual reality game at the private game server through the interactive interface; and
   a computerized gaming device in operative communication with the web server and including second software executing thereon, wherein the second software is configured to allow a second player of the plurality of players to select the at least one virtual reality game for play,
   wherein the interactive interface is configured to receive a selection of a public game served by the web server, and to privatize an instance of the at least one virtual reality game resulting in the guaranteed bandwidth and QoS provided by the first software,
   wherein the privatized instance of the at least one virtual reality game is hosted on the private game server and the privatized instance of the at least one virtual reality game includes a permissions group including at least a portion of the plurality of players, wherein the at least the portion of the plurality of players of the permissions group are based on a statistical prediction made by an algorithm as to a number of players required to be notified in order to result in a particular number of players that actually join the privatized instance of the at least one virtual reality game resulting in the guaranteed bandwidth and QoS provided by the first software; and
   wherein the private game server provides the at least the portion of the plurality of players in the permissions group with access to the privatized instance of the at least one virtual reality game, access to alter circumstances of the privatized instance of the at least one virtual reality game, access to control interactions within the privatized instance of the at least one virtual reality game, access to create or modify environments within the privatized instance of the at least one virtual reality game, and access to transition other players of the at least the portion of the plurality of players in the permissions group to the created or modified environments.

2. The VIP gaming system of claim 1, wherein the permissions group is issued invitations to enter the privatized instance of the at least one virtual reality game.

3. The VIP gaming system of claim 2, wherein the issued invitations are transmitted, by the web server, through text or email communications.

4. The VIP gaming system of claim 3, wherein the issued invitations include an interactive link to enter the privatized instance of the at least one virtual reality game.

5. The VIP gaming system of claim 2, wherein an invited player is enabled, by the interactive interface, to register to the VIP gaming service to be able to enter the privatized instance of the at least one virtual reality game.

6. The VIP gaming system of claim 1, wherein the permissions group includes a Friends list of the first player.

7. The VIP gaming system of claim 6, wherein the Friends lists is periodically updated or edited, by the web server.

8. The VIP gaming system of claim 1, wherein the permissions group includes clans of players.

9. The VIP gaming system of claim 8, wherein a clan leader of a clan of the clans of players invited to play the privatized instance of the at least one virtual reality game is enabled, by the interactive interface, to select members of the clan to enter the game.

10. A very important person (VIP) gaming method, comprising:
- receiving, at a web server, a request to privatize an instance of at least one virtual reality game hosted by a web server, wherein the privatized instance of the at least one virtual reality game is hosted by a private game server and has a guaranteed bandwidth and quality of service (QoS);
- statistically predicting, by an algorithm, a number of players for a permissions group that are required to be notified in order to result in a particular number of players that actually join the privatized instance of the at least one virtual reality game resulting in the guaranteed bandwidth and QoS;
- controlling, by a computerized gaming device of the first player of a plurality of players, entry to the privatized instance of the at least one virtual reality game through the permissions group;
- launching the privatized instance of the at least one virtual reality game at the private game server with players from the permissions group;
- controlling, by the computerized gaming device of the first player, circumstances and interactions during the launched privatized instance of the at least one virtual reality game;
- creating or modifying environments, by the computerized gaming device of the first player, within the privatized instance of the at least one virtual reality game; and
- transitioning, by the computerized gaming device of first player, players of the permissions group to the created or modified environment.

11. The VIP gaming method of claim 10, further comprising:
- issuing, through an interactive interface, invitations to the permissions group to enter the privatized instance of the at least one virtual reality game.

12. The VIP gaming method of claim 11, further comprising transmitting, by the web server, invitations through text or email communications.

13. The VIP gaming method of claim 12, further comprising including, by the web server, an interactive link in the transmitted invitations.

14. The VIP gaming method of claim 11, further comprising registering, by the web server, a player of the permissions group as a member of the VIP gaming service.

15. The VIP gaming method of claim 11, further comprising inviting, by the web server, clans of players of the permissions group to enter the privatized instance of the at least one virtual reality game.

16. The VIP gaming method of claim 15, further comprising selecting, through the interactive interface by a clan leader of a clan invited to play the privatized instance of the at least one virtual reality game, members of the clan to enter the privatized instance of the at least one virtual reality game.

17. The VIP gaming method of claim 10, further comprising using a Friends list of the first player as at least a portion of the permissions group.

18. The VIP gaming method of claim 17, further comprising periodically updating or editing, by the web server, the Friends list.

19. The VIP gaming method of claim 10, wherein the statistically predicting the number of players of the permissions group is based on historical evidence relative to ratios of invitees to game participants for any single game or for a group of games.

20. The VIP gaming method of claim 10, wherein the transitioning, by the computerized gaming device of first player, the players of the permissions group comprises:
- establishing a queue of players of the permissions group to enter the privatized instance of the at least one virtual reality game;
- determining if the privatized instance of the at least one virtual reality game has a threshold number of players having already joined based on a priority criterion; and
- denying entry to the privatized instance of the at least one virtual reality game based on the determining.

* * * * *